No. 640,789. Patented Jan. 9, 1900.
J. MITCHELL & H. C. LARSON.
MILK STERILIZER.
(Application filed May 31, 1899.)
(No Model.)
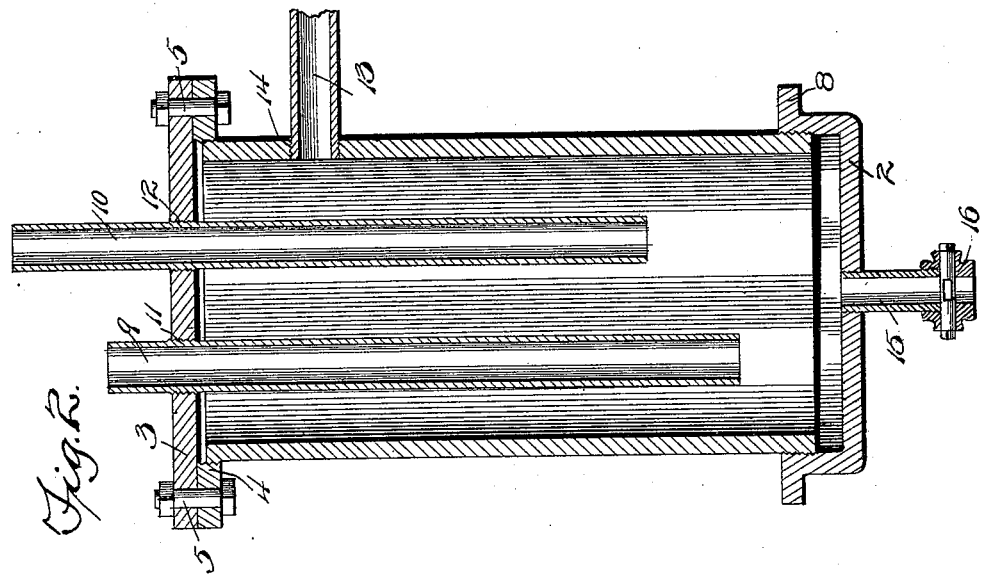
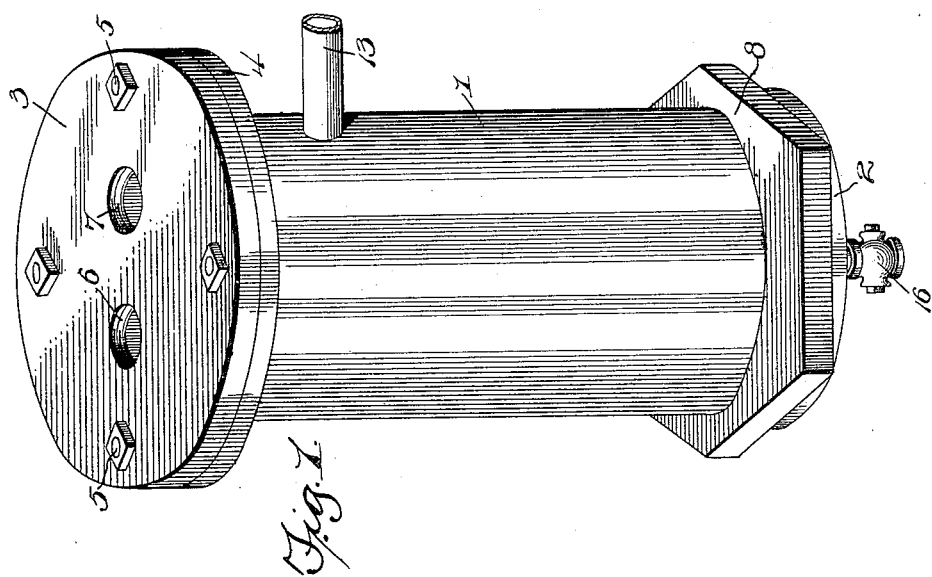
Witnesses
Ralph A. Shepard.
J. F. Riley
Inventors
John Mitchell
Henry C. Larson
By their Attorneys,
C. A. Snow & Co.
THE NORRIS PETERS CO., PHOTO-LITHO., WASHINGTON, D. C.

UNITED STATES PATENT OFFICE.

JOHN MITCHELL AND HENRY CLARENCE LARSON, OF DODGEVILLE, WISCONSIN.

MILK-STERILIZER.

SPECIFICATION forming part of Letters Patent No. 640,789, dated January 9, 1900.

Application filed May 31, 1899. Serial No. 718,840. (No model.)

*To all whom it may concern:*

Be it known that we, JOHN MITCHELL and HENRY CLARENCE LARSON, citizens of the United States, residing at Dodgeville, in the county of Iowa and State of Wisconsin, have invented a new and useful Milk-Sterilizer, of which the following is a specification.

The invention relates to improvements in milk-sterilizers.

The object of the present invention is to improve the construction of milk-sterilizers and to provide a simple and comparatively inexpensive device designed for sterilizing skimmed milk and capable of enabling such operation to be effected by the exhaust-steam of an engine.

The invention consists in the construction and novel combination and arrangement of parts hereinafter fully described, illustrated in the accompanying drawings, and pointed out in the claim hereto appended.

In the drawings, Figure 1 is a perspective view of a milk-sterilizer constructed in accordance with this invention, the longitudinal tubes being removed. Fig. 2 is a longitudinal sectional view showing the complete device.

Like numerals of reference designate corresponding parts in all the figures of the drawings.

1 designates a cylinder provided at its lower end with a cap 2 and having a head 3 at its upper end, and the lower end of the cylinder is threaded and engages interior screw-threads of the cap, as clearly illustrated in Fig. 2 of the accompanying drawings. The upper end of the cylinder is provided with an annular flange 4, perforated at intervals for the reception of bolts 5 or other suitable fastening devices, which pass through the head 3 and secure the same to the flange 4. The head is provided at opposite sides of its center with threaded openings 6 and 7, and the cap, which is arranged at the bottom of the cylinder, is provided with a polygonal flange 8, designed to receive a wrench or other suitable tool for screwing the cap on and off the cylinder. The openings 6 and 7 receive longitudinal tubes or pipes 9 and 10, extending into the cylinder and terminating short of the lower end thereof and provided near their upper ends with threaded portions 11 and 12 to engage the screw-threads of the openings 6 and 7. The lower end of the tube 10 is arranged above the lower end of the tube 9, which is designed to permit skimmed milk to be introduced into the device, and any suitable means may be provided for controlling the flow of such milk. The other tube or pipe 10 is designed to be connected with the exhaust of an engine, whereby exhaust-steam is discharged into the cylinder. The exhaust-steam is adapted to raise the temperature of the skimmed milk to about 160° and the skimmed milk is discharged through a horizontal pipe or tube 13, located near the top of the cylinder and having its inner end 14 threaded into a suitable aperture of the same. The discharge-pipe is located a sufficient distance below the top of the cylinder (the point where the skimmed milk is introduced) to enable the latter to flow freely from the cylinder. The exhaust-steam operating on the milk sterilizes the same, and it has been found by experience that skimmed milk operated on in this manner will remain sweet for twenty-four hours in warm weather, after the cream has been separated from it, and that in cold weather it will remain sweet for a much longer period.

The cap is provided with a depending drain-pipe 15, having a suitable cock or cut-off 16 and adapted to permit the liquid contents of the device to be readily drawn off after the operation of sterilizing milk has been completed and it is desired to clean the device.

The invention has the following advantages: The device is exceedingly simple and inexpensive in construction, it enables milk to be readily handled, and it employs the exhaust-steam of an engine for sterilizing the milk. Also the device may be readily washed after the operation of sterilizing milk has been completed.

Changes in the form, proportion, size, and the minor details of construction within the scope of the appended claim may be resorted to without departing from the spirit or sacrificing any of the advantages of this invention.

What is claimed is—

A device of the class described comprising a vertical receptacle provided at its top with threaded openings 6 and 7, a drain-pipe depending from the bottom of the receptacle, the vertical tube 9 threaded into the opening 6 and terminating short of the bottom of the receptacle and forming a conduit for skimmed milk, the steam-pipe 10 threaded into the opening 7 and terminating short of the lower end of the tube 9, and the milk-discharge pipe extending horizontally from the upper portion of the receptacle and located at a point above the lower ends of the said tube and pipe, substantially as described.

In testimony that we claim the foregoing as our own we have hereto affixed our signatures in the presence of two witnesses.

JOHN MITCHELL.
HENRY CLARENCE LARSON.

Witnesses:
J. T. BOYLE,
GEO. W. STRONG.